US007423589B2

United States Patent
Ferreol et al.

(10) Patent No.: US 7,423,589 B2
(45) Date of Patent: Sep. 9, 2008

(54) METHOD FOR LOCALISING AT LEAST ONE EMITTER

(75) Inventors: Anne Ferreol, Colombes (FR); Dominique Heurguier, Le Perreux sur Marne (FR)

(73) Assignee: Thales (FR)

( * ) Notice: Subject to any disclaimer, the term of this patent is extended or adjusted under 35 U.S.C. 154(b) by 0 days.

(21) Appl. No.: 10/578,379

(22) PCT Filed: Oct. 29, 2004

(86) PCT No.: PCT/EP2004/052736

§ 371 (c)(1),
(2), (4) Date: May 5, 2006

(87) PCT Pub. No.: WO2005/045467

PCT Pub. Date: May 19, 2005

(65) Prior Publication Data

US 2007/0069949 A1  Mar. 29, 2007

(30) Foreign Application Priority Data

Nov. 7, 2003  (FR) .................................. 03 13128
May 14, 2004  (FR) .................................. 04 05254

(51) Int. Cl.
 G01S 5/02 (2006.01)
 G01S 5/04 (2006.01)
 G01S 3/02 (2006.01)
(52) U.S. Cl. .................. 342/417; 342/430; 342/449; 342/451; 342/463; 342/465

(58) Field of Classification Search .................. 342/377, 342/417, 430–431, 449, 451, 463–465
See application file for complete search history.

(56) References Cited

U.S. PATENT DOCUMENTS

2004/0189525 A1* 9/2004 Beadle et al. ................ 342/451

OTHER PUBLICATIONS

J. Sheinvald et al., Localization of multiple sources with moving arrays, IEEE Transactions on Signal Processing, vol. 46(10), p. 2736-2743, Oct. 1998.*
Claims for 11/085253.*
Sheinvald J et al: "Localization of multiple sources with moving arrays" Acoustics, Speech, and Signal Processing, 1997. Icassp-97., 1997 IEEE International Conference on Munich, Germany Apr. 21-24, 1997, Los Alamitos, CA.

* cited by examiner

Primary Examiner—Thomas H. Tarcza
Assistant Examiner—Fred H. Mull
(74) Attorney, Agent, or Firm—Lowe Hauptman Ham & Berner, LLP

(57) ABSTRACT

The invention relates to a method of localization of one or more sources, said source or sources being in motion relative to a network of sensors, the method comprising a step of separation of the sources in order to identify the direction vectors associated with the response of the sensors to a source having a given, incidence, characterized in that it comprises at least the following steps:
 associating the direction vectors $a_{1m} \ldots a_{Km}$ obtained for the $m^{th}$ transmitter and respectively at the instants $t_1 \ldots t_K$,
 localizing the $m^{th}$ transmitter from the associated vectors $a_{1m} \ldots a_{Km}$.

7 Claims, 3 Drawing Sheets

METHOD FOR LOCALISING AT LEAST ONE EMITTER

CROSS-REFERENCE TO RELATED APPLICATIONS

The present Application is based on International Application No. PCT/EP2004/052736, filed on Oct. 29, 2004, which in turn corresponds to France Application Ser. No. 0313128 filed on Nov. 7, 2003 and France Application No. 0405254, filed on May 14, 2004, and priority is hereby claimed under 35 USC §119 based on these applications. Each of these applications are hereby incorporated by reference in their entirety into the present application.

FIELD OF THE INVENTION

The invention relates to a method for the localization of one or more transmitters.

It can be applied essentially to the localization of transmitters on the ground from a moving vehicle without a priori knowledge concerning the signals sent.

The technical field in particular is that of the passive localization of transmitters.

BACKGROUND OF THE INVENTION

FIG. 1 illustrates an airborne localization. The transmitter is at the position $(x_0,y_0,z_0)$. The carrier at the instant $t_k$ is at the position $(x_k,y_k,z_k)$ and perceives the transmitter at the angles of incidence $(\theta(t_k,x_0,y_0,z_0), \Delta(t_k,x_0,y_0,z_0))$. The angles $\theta(t,x_0,y_0,z_0)$ and $\Delta(t,x_0,y_0,z_0)$ evolve in time and depend on the position of the transmitter as well as the trajectory of the carrier.

The angles $\theta(t,x_0,y_0,z_0)$ and $\Delta(t,x_0,y_0,z_0)$ are determined relative to a network of N antennas that can be fixed beneath the carrier as shown in FIG. 2.

There are several existing techniques to determine the position $(x_m, y_m, z_m)$ of a transmitter. These techniques of localization differ especially in the parameters which are estimated instantaneously at the level of the network of sensors. They can be classified as follows.

Use of Goniometry

These techniques are known and used in the prior art. In most cases, they are based on a 1D azimuthal goniometry. The azimuths $\theta_{km} = \theta(t_k,x_m,y_m,z_m)$ associated with the $m^{th}$ transmitter are measured for different instants $t_k$. In using the position $(x_k,y_k,z_k)$ of the carrier at the corresponding instant k, a position $(x_{mk},y_{mk},z_{mk})$ of the transmitter m is estimated by a ground intersection. The position $(x_k,y_k,z_k)$ of the carrier is given by a GPS unit, its orientation is obtained by a compass in the case of a ground carrier and by an inertial navigation system in the case of an aircraft. From all the positions $(x_{mk}, y_{mk}, z_{mk})$, the method extracts data with which it is possible to determine the M dominant positions $(x_m,y_m,z_m)$ of the incident transmitters. The localization is obtained by triangulation or by ground intersection (2D goniometry). The drawback of triangulation techniques is that they require major movement. Furthermore, goniometry techniques require the use of a network of non-ambiguous sensors. This has the drawback of necessitating a calibration table and restricting the size of the sensor network and therefore giving incidence values of limited precision.

Use of the Phase Difference Between Two Remote Sensors

The inter-sensor phase difference $\Delta\phi(t_k,x_0,y_0,z_0)$ depends on the positions of the two sensors as well as the incidence $(\theta(t_k,x_0,y_0,z_0), \Delta(t_k,x_0,y_0,z_0))$ of the transmitter. This phase, which depends on time, is directly related to the position $(x_0,y_0,z_0)$ of the transmitter. Consequently, studying the function of time $\Delta\phi(t,x_0,y_0,z_0)$ makes it possible to deduce the position $(x_0,y_0,z_0)$ of the transmitter. In this group of applications, the two sensors are distant in order to augment the precision of measurement of the phase. This has the drawback of causing variations in the phase difference $\Delta\phi(t,x_0,y_0,z_0)$ as a function of time over more than $2\pi$ and the technique then necessitates a step enabling the phase to be made to vary by more than $2\pi$. Furthermore, in this technique, the phase is measured by carrying out a direct intercorrelation between two sensors, and cannot be used to deal with the multiple-sensor case.

Use of the Measurement of the Carrier Frequency of the Transmitter

These techniques make use of the fact that the estimated carrier frequency is the sum of the carrier frequency of the transmitter and the Doppler shift due to the speed of movement of the carrier. The Doppler shift has the advantage of depending on the position $(x_0,y_0,z_0)$ of the transmitter and of also being a function of the time $\Delta f(t,x_0,y_0,z_0)$. Consequently, studying the function of the time $\Delta f(t,x_0,y_0,z_0)$ makes it possible to deduce the position $(x_0,y_0,z_0)$ of the transmitter therefrom. However, the measurement of this Doppler shift has the drawback of necessitating transmitters with particular waveforms. This measurement of frequency can be done by cyclical techniques in which it is assumed that the signal sent is non-circular.

Use of Propagation Times

These techniques use the differences in propagation time between antennas (TDOA or time difference of arrival) which are directly related to the respective differences between the transmitter and the different antennas and therefore to the position $(x_0,y_0,z_0)$ of the transmitter. The use of at least three antennas that are sufficiently spaced out enables the position $(x_0,y_0,z_0)$ of the transmitter to be deduced by hyperbolic localization. The drawback of these techniques is that they cannot be implemented in a single-carrier context owing to the considerable spacing required between antennas. Furthermore, in these techniques, the time difference is measured by the direct performance of an inter-correlation between two sensors. This approach cannot be used to deal with the case involving multiple transmitters.

SUMMARY OF THE INVENTION

The method of the invention relies especially on a novel approach for the direct estimation of the positions $(x_m, y_m, z_m)$ of each of the transmitters from a parametric analysis of the multipath signal at various instants $t_k$ on a duration Dt. The parametric analysis especially has the additional function of separating the different transmitters at each point in time $t_k$. Then, the parameters of a same transmitter coming from the different points in time $t_k$ are associated to finally localize each of the transmitters.

The invention relates to a method of localization of one or more sources, said source or sources being in motion relative to a network of sensors, the method comprising a step of separation of the sources in order to identify the direction vectors associated with the response of the sensors to a source having a given angle of incidence. The method is characterized in that it comprises at least the following steps:

associating the direction vectors $a_{1m} \ldots a_{Km}$ of the $m^{th}$ transmitter obtained respectively at the instants $t_1 \ldots t_K$, localizing the $m^{th}$ transmitter from the associated vectors $a_{1m} \ldots a_{Km}$.

The method of the invention has especially the following advantages:

- it enables the localization of the position of the transmitter in (x, y, z) coordinates and, in addition, that of its speed vector,
- it can be applied when there are one or more incident transmitters present,
- its implementation does not require any particular knowledge of the signal sent,
- it enables the use of a network of ambiguous sensors, i.e. several incidence values are associated with the same response of the network which have the advantage of being great and therefore of being more robust with respect to inter-antenna coupling phenomena or, more generally, antenna-network modeling errors,
- it can be implemented in networks calibrated in (θ,Δ),
- it can be implemented in networks with amplitude-diversity antennas such as co-localized antennas: networks with dipoles having the same phase center and different orientations.

Other features and advantages of the object of the present invention shall appear more clearly from the following description given by way of an illustration that in no way restricts the scope of the invention and from the appended figures, of which:

DETAILED DESCRIPTION OF THE DRAWINGS

Figure 1:
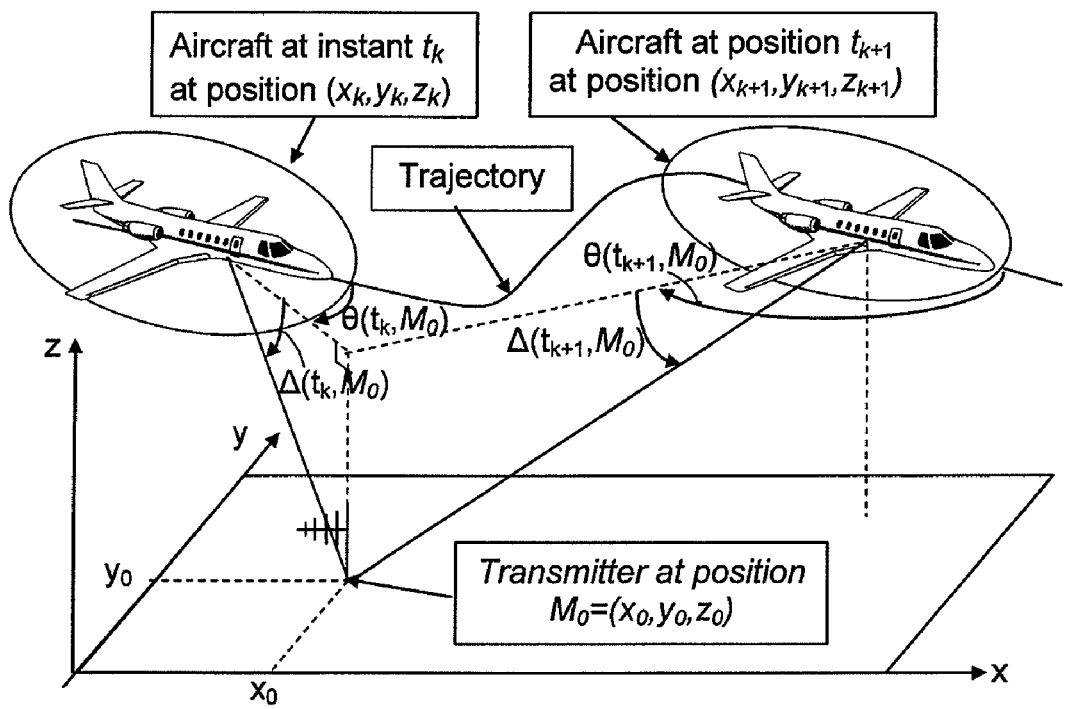
FIG. 1 shows the principle of the localization by an aircraft of a transmitter positioned on the ground.
Figure 2:
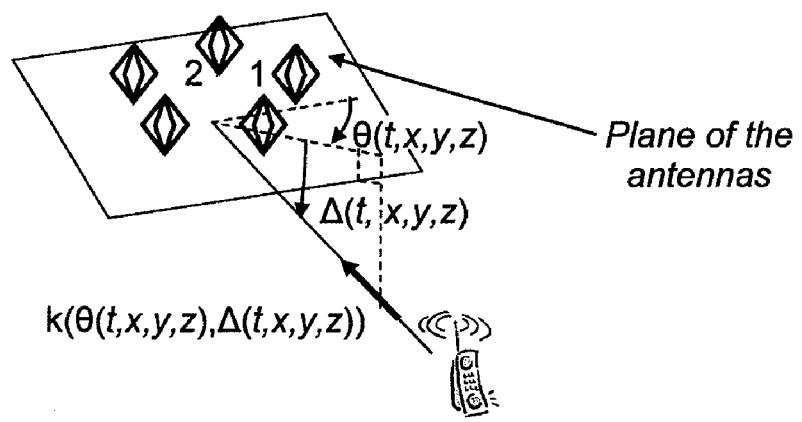
FIG. 2 shows the relationship between a network of antennas and the value of incidence of a transmitter.

In order to provide for a clearer understanding of the object of the present invention, the following description is given by way of an illustration that in no way restricts the scope of the invention for the localizing of several transmitters positioned on the ground using a network of sensors installed in an aircraft in motion. Such a system is described for example in FIG. 1. The aircraft is equipped with a processor adapted to implementing the steps of the method according to the invention.

The method can also be implemented in the context of vehicles moving on the ground.

Figure 3:
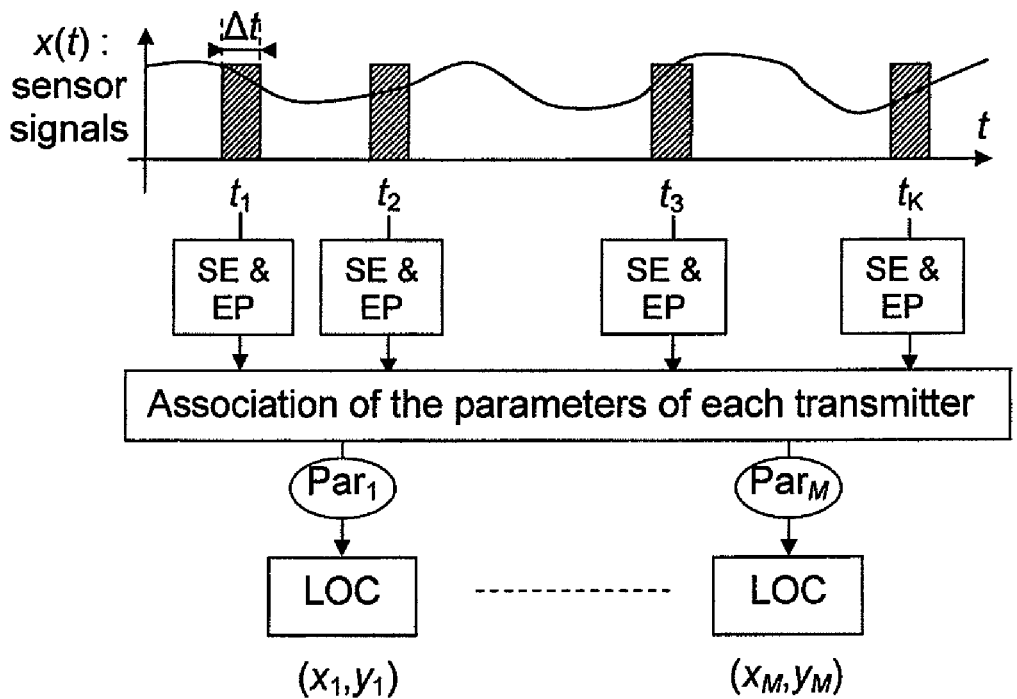
FIG. 3 is a general drawing explaining the working of the method according to the invention.
Figure 4:
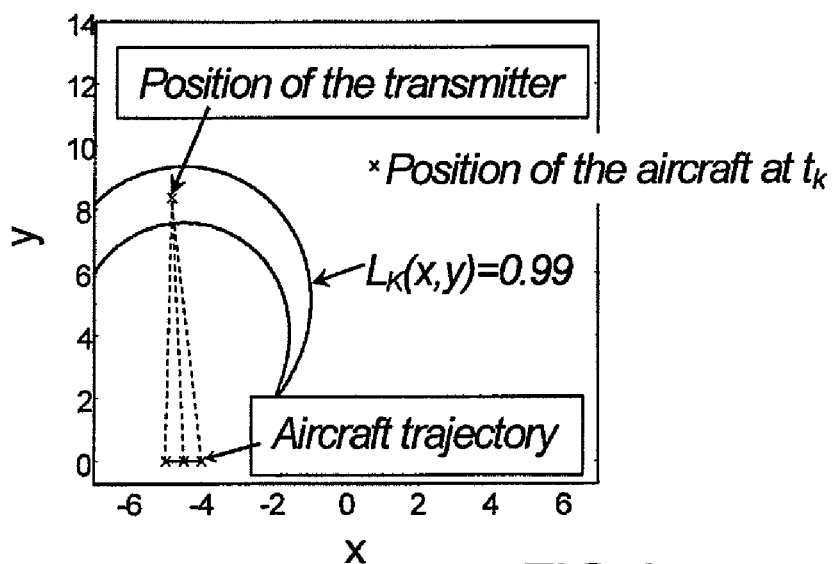
FIGS. 4, 5 and 6 are examples of implementation of the method according to the invention.

FIG. 3 is a representation, in a signal time/amplitude graph, of the signal x(t) formed by a combination of the signals of the transmitters at different instants $t_1, t_2, \ldots t_K$. This figure summarizes the different steps implemented, namely the separation of the transmitters SE and the parametric estimation EP, the association of the parameters of each transmitter and the localization of a transmitter.

In the presence of M transmitters, at the instant t at output from the N sensors of the network, the method has the vector x(t) representing the mixture of signals from the M transmitters. Around the instant $t_k$, the vector $x(t+t_k)$ sized N×1, representing the mixture of the signals from the M transmitters, is expressed as follows:

$$x(t + t_k) = \sum_{m=1}^{M} a(\theta_{km}, \Delta_{km}) s_m(t + t_k) + b(t + t_k) \quad (1)$$

$$= A_k s(t + t_k) + b(t + t_k) \text{ for } |t| < \Delta t / 2$$

where b(t) is the noise vector assumed to be Gaussian, a(θ,Δ) is the response of the network of sensors to a source having an incidence (θ,Δ), $A_k=[a(\theta_{k1}, \Delta_{k1}) \ldots a(\theta_{kM}, \Delta_{kM})]$, $s(t)=[s_1(t) \ldots s_M(t)]^T$, $\theta_{km}=\theta(t_k,x_m,y_m,z_m)$ and $\Delta_{km}=\Delta(t_k,x_m,y_m,z_m)$. In this model, the mix matrix $A_k$ depends on the instant $t_k$ of observation.

The direction vector with incidence corresponding to the $m^{th}$ transmitter at the instant $t_k$ $$a_{km}=a(\theta_{km}, \Delta_{km})=a(t_k,x_m,y_m,z_m) \text{ of the } m^{th} \text{ transmitter} \quad (2)$$

is a known function of $t_k$ and of the position of the transmitter $(x_m,y_m,z_m)$.

The method according to the invention comprises at least the following steps:

1. estimating one or more parameters associated with the position of the source, for example the direction vectors, the incidence values, the position etc. and separating the M transmitters for the different instants $t_k$: this consists in identifying the direction vectors having an incidence $a_{km}$ for (1≦m≦M). This first step is performed, for example, by means of source separation techniques known to those skilled in the art.
2. associating the parameters estimated for the $m^{th}$ transmitter, for example in associating the different direction vectors having incidence values, $a_{1m} \ldots a_{km}$ obtained respectively at the instants $t_1, \ldots t_k$,
3. localizing the $m^{th}$ transmitter from the associated vectors.

Association Step

In the presence of M transmitters and after separation of sources, the method, at the instant $t_k$, possesses the M signatures $a_{km}$ for (1≦m≦M). At the instant $t_{k+1}$ the source separation gives the M vectors $b_i$ for (1≦i≦M). The goal of this tracking is to determine, for the $m^{th}$ transmitter, the index i(m) which minimizes the difference between $a_{km}$ and $b_{i(m)}$. In this case, it will be deduced therefrom that $a_{k+1, m}=b_{i(m)}$. To make this association, the measure of closeness between two vectors u and v is defined, for example, by:

$$d(u, v) = 1 - \frac{|u^H v|^2}{(u^H u)(v^H v)} \quad (3)$$

where $u^H$ is the conjugate transpose of the vector u and where $b_{i(m)}=b_1+ \ldots +b_m+ \ldots +b_{m1}$ where $b_m=a_m$, where each $a_m$ is associated with an $s_m$, Thus, the index i(m) verifies:

$$d(a_{km}, b_{i(m)}) = \min_{1 \leq i \leq M} [d(a_{km}, b_i)] \quad (4)$$

hence $$d(a_{km}, b_{i(m)}) = \min_{1 \leq i \leq M} \left[ 1 - \frac{|a_{km}^H b_{i(m)}|^2}{(a_{km}^H a_{km})(b_{i(m)}^H b_{i(m)})} \right]$$

In this association, we consider a function $\beta_m$ associated with the $m^{th}$ transmitter:

$$\beta_m(t_k) = d(a_{km}, a_{0m}) \quad (5)$$

In the course of the association, for each transmitter m is obtained and for $1 \leq m \leq M$, the function $\beta_m(t)$ is obtained. This function is aimed especially at eliminating the instants $t_k$ whose value $\beta_m(t_k)$ appears to be far too distant from an interpolation of the function $\beta_m(t)$, i.e. the aberrant instants which may be associated with other transmitters are eliminated. A zone of tolerance $+/-\Delta$ is defined around the curve defined by the function $\beta_m(t_k)$ This zone of tolerance will depend on the precision of estimation of the direction vectors $a_{km}$. In particular, in the presence of M=1 sources, the zone will be in the range of $\Delta = 3/\sqrt{B\Delta t}$ (where $\Delta t$ is the elementary time of parametric estimation illustrated in FIG. 3 and B is the instantaneous band of the signal x(t)).

The steps of this association for K instants $t_k$ are for example the following:

Step ASE-1: Initialization of the process at k=2. The initial number M of transmitters is for example determined by a test to detect the number of sources at the instant to known $t_0$ those skilled in the art, Step ASE-2: For $1 \leq m \leq M$ determining the indices i(m) in applying the equation (4) and in using the vector $a_{k,m}$ with $1 \leq m \leq M$ and the vectors $b_i$ identified at the instant $t_{k+1}$ for ($1 \leq i \leq M$), Step ASE-3: For $1 \leq m \leq M$ performing the operation $a_{k+1\ m} = b_{i(m)}$, Step ASE-4: Incrementing $k \leftarrow k+1$ and if k<K returning to the step ASE-1, Step ASE-5: Starting from the family of instants $\Phi = \{t_1 < \ldots < t_K\}$, eliminating the/instants $t_i \in \Phi$ such that the coefficients $\beta_m(t_i)$ do not belong to the zone demarcated by the interpolation curve of the $\beta_m(t_k)$ values and the zone of tolerance $\Delta$. The instants $t_k$ where $|\beta_m(t_k) - \beta_m(t_{k-1})| < \Delta$ will also be eliminated. After this sorting, the new family of instants is $\Phi = \{t_1 < \ldots < t_J\}$ and we assume K=1.

At the end of these steps, the method has determined the vectors $a_{1m} \ldots a_{Km}$ associated with the $m^{th}$ transmitter.

Localization of a Transmitter

The method determines the position of the $m^{th}$ transmitter from the components of the vectors $a_{1m}$ up to $a_{Km}$. These vectors $a_{km}$ have the particular feature of depending on the instant $t_k$ and above all on the position $(x_m, y_m, z_m)$ of the transmitter. In particular, for a network formed by N=2 sensors spaced out by a distance d in the axis of the carrier, the vector verifies $a_{km}$:

$$a_{km} = \begin{bmatrix} 1 \\ \exp\left(j2\pi \frac{d}{\lambda}\cos(\theta(t_k, x_m, y_m, z_m))\cos(\Delta(t_k, x_m, y_m, z_m))\right) \end{bmatrix} = \quad (6)$$

$$a(t_k, x_m, y_m, z_m)$$

The value 1 of the first component corresponds to the reference sensor. According to FIG. 1, the incidence ($\theta(t_k, x_m, y_m, z_m)$, $\Delta(t_k, x_m, y_m, z_m)$) can be directly computed from the position $(x_k, y_k, z_k)$ of the carrier at the instant $t_k$ and the position $(x_m, y_m, z_m)$ of the transmitter.

Step of Transformation of the Vector

According to a first alternative embodiment, the method comprises a step of correction of the $a_{km}$, values, the measurement of the direction vectors $a_{km}$ is generally obtained to within an indeterminate complex factor. According to this first variant, the method comprises a step of reducing the phase reference of the direction vector measured in reducing the operation to the phase barycenter (defined to within a constant scalar coefficient that may be set at 1). This operation is performed, for example, by estimating the correction coefficient determined by the following conversion of the values $a_{km}$ into values $a'_{km}$:

$$a'_{km} = \left(\prod_i \frac{a_i}{|a_i|}\right)^{-\frac{1}{N}} a_{km} \quad (7)$$

The correction coefficient is not totally determined by this expression given the Nth order indeterminacy of the complex root. A tracking of the phase evolution during the observation period is therefore done.

Since the complex coefficient is defined to within a factor from among the N $N^{th}$ roots of the unit, the phase tracking consists in arbitrarily setting the first correction coefficient (in taking the root 1 for example), and then in determining, at each new iteration k+1, the coefficient that minimizes the mean phase differences between the direction vector recentered at k+1 and the vector recentered at the instant k.

The minimization criterion for measurement at the same frequency may be equal to:

$$\min_{\rho \in \sqrt[N]{1}} \sum_{\rho \varepsilon\ value} \min\left(\text{mod}\left(\left|\arg\left(\frac{\rho \cdot a_{k+1}(i)}{a_k(i)}\right)\right|, 2\pi\right),\right. \quad (8)$$

$$\left. 2\pi - \text{mod}\left(\left|\arg\left(\frac{\rho \cdot a_{k+1}(i)}{a_k(i)}\right)\right|, 2\pi\right)\right)$$

where the values $a_{k+1}$ are the direction vectors recentered with the correction coefficient arbitrarily determined by any one of the Nth roots of the expression. For measurement at different frequencies, it is possible to compare the phases of the components of the two direction vectors in correcting them by a power given by the ratio of these two frequencies.

If we consider the vectors $b_{km} = a'_{km}$, it is then possible to compare this measurement with the theoretical value $b(t_k, x_m, y_m, z_m)$ for which the theoretical direction vector $a(t_k, x_m, y_m, z_m)$ is computed for a theoretical origin at the theoretical (geometrical) phase barycenter (geometrical locus for which the theoretical sum of the phases differences gets cancelled out). This locus (generally) does not coincide with the phase center of the network.

According to another alternative embodiment, the method comprises a step of conversion of the vector $a_{km}$ into a vector $b_{km}$ whose components are formed out of components of the vector $a_{km}$. In particular, the method builds for example the vector $b_{km}$ sized (N-1)×1 in choosing a reference sensor in n=i:

$$b_{km} = \begin{bmatrix} a_{km}(1)/a_{km}(i) \\ \vdots \\ a_{km}(i-1)/a_{km}(i) \\ a_{km}(i+1)/a_{km}(i) \\ \vdots \\ a_{km}(N)/a_{km}(i) \end{bmatrix} = b(t_k, x_m, y_m, z_m) \quad (9)$$

where $a_{km}(i)$ is the $i^{th}$ component of $a_{km}$

The components of $b_{km}$ correspond in this case to the ratios of the components of the vector $a_{km}$ and of the vector $a_{km}(i)$.

Thus in the example of the equation (6) in fixing i=1 we get:

$$b_{km} = \left[\exp\left(j2\pi\frac{d}{\lambda}\cos(\theta(t_k, x_m, y_m, z_m))\cos(\Delta(t_k, x_m, y_m, z_m))\right)\right] = \quad (10)$$

$$a_{km}(2)/a_{km}(1)$$

It being known that the direction vectors $a_{km}$ are estimated with a certain error $e_{km}$ such that $a_{km}=a(t_k,x_m,y_m,z_m)+e_{km}$, it can be deduced therefrom that the same is true for the converted vector $b_{km}$ of (9).

Step of Maximization of a Correlation Criterion

It being known that the vector $a_{km}$ is a function of the position $(x_m,y_m,z_m)$ of the transmitter, the same is true for the vector $b_{km}$. The method comprises a step of maximization of a normalized vector correlation $L_K(x,y,z)$ in the space $(x,y,z)$ of position of a transmitter where $$L_K(x, y, z) = \frac{|b_K^H v_K(x, y, z)|^2}{(b_K^H b_K)(v_K(x, y, z)^H v_K(x, y, z))} \quad (11)$$

with $$b_K = \begin{bmatrix} b_{1m} \\ \vdots \\ b_{Km} \end{bmatrix} = v_K(x_m, y_m, z_m) + w_K,$$

$$v_K = (x, y, z) = \begin{bmatrix} b(t_1, x, y, z) \\ \vdots \\ b(t_K, x, y, z) \end{bmatrix}$$

and $w_K = \begin{bmatrix} w_{1m} \\ \vdots \\ w_{Km} \end{bmatrix}$

The noise vector $w_K$ has the matrix of covariance $R=E[w_K w_K^H]$. Assuming that the matrix R is known, the criterion can be envisaged with a whitening technique. Under these conditions the following $L_K'(x,y,z)$ criterion is obtained:

$$L_{K'}(x, y, z) = \frac{|b_K^H R^{-1} v_K(x, y, z)|^2}{(b_K^H R^{-1} b_K)(v_K(x, y, z)^H R^{-1} v_K(x, y, z))} \quad (12)$$

With $R = E[w_K w_K^H]$

It must be noted that the criteria of the equations (11) and (12) are equal when $R=\sigma_o^2 I$, i.e. when the errors are considered to be of equal level on all the sensors and independent between sensors. The criterion $L_K(x,y,z)$ of the equation (12) is therefore valid for a white statistics model noise $w_K$. The criteria $L_K(x,y,z)$ and $L_K'(x,y,z)$ range between 0 and 1 and verify $L_K(x,y,z)=L_K'(x,y,z)=1$ for the position $(x_m,y_m,z_m)$ of the $m^{th}$ transmitter. This normalization enables the setting of an efficient threshold of localization $\eta$. Thus, all the maximum values $(x_m,y_m,z_m)$ of $L_K(x,y,z)$ which verify $L_K(x_m,y_m,z_m)>\eta$ are considered to be good localizations. The threshold may be set as a function of an approximate knowledge of the statistics of $w_K$.

The criteria $L_K(x,y,z)$ and $L_K'(x,y,z)$ have the advantage of being capable of implementing a technique of localization in the presence of a network of sensors calibrated in space $(\theta,\Delta)$. It being known that, at the instant $t_k$, the analytic relationship linking the incidence $(\theta(t_k,x,y,z), \Delta(t_k,x,y,z))$ of the transmitter with its position $(x,y,z)$ is known, it is then possible, from the incidence $(\theta(t_k,x,y,z), \Delta(t_k,x,y,z))$, to deduce the vector $a(t_k,x_m,y_m,z_m)=a(\theta(t_k,x,y,z), \Delta(t_k,x,y,z))$ in carrying out an interpolation of the calibration table (relative to the calibrated antennas). It may be noted, however, that this method is insensitive to a phase bias (owing to the vector correlation criterion), These criteria also make it possible to take account of the phase and amplitude of the components of $a(\theta,\Delta)$. The method can therefore be envisaged with networks of co-localized antennas with pattern diversity. It must be noted that, in an airborne context, knowledge of the altitude h of the aircraft reduces the computation of the criterion in the search space $(x,y)$ in assuming $z=h$. In the example of the equations (6) and (10), the vector $v_k(x,y,z)$ is written as follows:

$$v_K(x, y, z) = \begin{bmatrix} \exp\left(j2\pi\frac{d}{\lambda}\cos(\theta(t_1, x, y, z))\cos(\Delta(t_1, x, y, z))\right) \\ \vdots \\ \exp\left(j2\pi\frac{d}{\lambda}\cos(\theta(t_K, x, y, z))\cos(\Delta(t_K, x, y, z))\right) \end{bmatrix} \quad (13)$$

In this method, it is possible to envisage initializing the algorithm at $K=K_0$ and then recursively computing the criterion $L_K(x,y,z)$. Under these conditions, $L_K(x,y,z)$ is computed recursively as follows:

$$L_{K+1}(x, y, z) = \frac{|\alpha_{K+1}(x, y, z)|^2}{\beta_{K+1}\gamma_{K+1}(x, y, z)} \quad (14)$$

where $\alpha_{K+1}(x, y, z) = \alpha_K(x, y, z) + b_{K+1m}^H b(t_{K+1}, x, y, z)$ $\gamma_{K+1}(x, y, z) = \gamma_K(x, y, z) + b(t_{K+1}, x, y, z)^H b(t_{K+1}, x, y, z)$ $\beta_{K+1} = \beta_K + b_{K+1m}^H b_{K+1m}$ The coefficients $\alpha_{K+1}(x,y,z)=\alpha_K(x,y,z)\gamma_{K+1}(x,y,z)=\gamma_K(x,y,z), \beta_{K+1}=\beta_K$ are intermediate spectra enabling the computation of $L_{K+1}(x,y,z)$.

When the vectors $b(t_{K+1},x,y,z)$ and $b_{km}$ have constant norms equal to $\rho$ the relationship of recurrence of the equation (14) becomes:

$$L_{K+1}(x, y, z) = \frac{|\alpha_{K+1}(x, y, z)|^2}{\beta^2(K+1)^2} \quad (15)$$

where $\alpha_{K+1}(x, y, z) = \alpha_K(x, y, z) + b_{K+1m}^H b(t_{K+1}, x, y, z)$ The method has been described hitherto in assuming that the vectors have fixed positions. It can easily be extended to the case of moving targets with a speed vector $(v_{xm},v_{ym},v_{zm})$ for which there is a model of evolution. In these conditions, the incidence of the $m^{th}$ transmitter can be parametrized as follows:

$\theta_{km}=\theta(t_k, x_m-v_{xm}t_k, y_m-v_{ym}t_k, z_m-v_{zm}t_k)$ $et\ \Delta_{km}=\Delta(t_k, x_m-v_{xm}t_k, y_m-v_{ym}t_k, z_m-v_{zm}t_k)$ (16)

where $(x_m,y_m,z_m)$ is the position of the transmitter at the instant $t_0$ and $(v_{xm},v_{ym},v_{zm})$ are the components of the speed of the transmitter at the instant $t_0$. In these conditions, the vector $b_{km}$ of the equation (9) is parametrized by $(x_m, y_m, z_m)$ and $(v_{xm}, v_{ym}, v_{zm})$ as follows:

$$b_{km} = b(t_k, x_m, y_m, z_m, v_{xm}, v_{ym}, v_{zm}) + w_{km} \quad (17)$$

Naturally, the criteria of localization $L_K$ and $L_K'$ of the equations (11) and (12) are no longer parametrized solely by $(x,y,z)$ but also by $(v_x, v_y, v_z)$. The method then consists in maximizing the criterion $L_K(x,y,z, v_x, v_y, v_z)$ as a function of the 6 parameters $(x,y,z, v_x, v_y, v_z)$.

The method can be applied to a very large number of measurements. In this case, the method comprises a step of reduction of the numerical complexity of computation (which depends on the number of measurements) by reducing K. The method provides for the following processing operations to be performed on the elementary measurements:

- decimation of the instants $t_k$, in eliminating the neighboring instants for which the development of the curve $\beta_m(t_k)$ is not significant,
- filtering (smoothing of the measurements which are the direction vectors) and sub-sampling,
- the measurements are then merged on a defined duration (extraction by association of direction vector to produce a synthesis measurement).

Recapitulation of the Steps of the Method

The process of localization of several transmitters using K instants $t_k$ can be summarized by the following steps:

Step No. 1: Identification of the vectors $a_{km}$ for ($1 \leq m \leq M$) at the K instants $t_k$ in applying for example a technique of source separation, and source identification as described in the references [2] [3].

Step No. 2: Association of the vectors $a_{1m}$ up to $a_{km}$ obtained at the respective instants $t_1 \ldots t_K$ associated with the $m^{th}$ transmitter for $1 \leq m \leq M$ in applying the steps ASE-1 to ASE-5 described here above.

Step No. 3: Initialization of the process at m=1.

Step n°4: Conversion of the K vectors $a_{km}$ into vectors $b_{km}$ as suggested by the equation (9).

Step No. 5: Computation and maximization of the criterion $L_K(x,y,z)$ of the equation (11) to obtain the position $(x_m, y_m, z_m)$ of the $m^{th}$ transmitter.

Step No. 6: Incrementing m←m+1 and if m<M return to the step No. 3. In order to refine the estimation of the position $(x_m, y_m, y_m)$ of the transmitters, the steps of the method may be performed iteratively as follows:

Step No. 7: Identification of the vectors $b_i$ for ($1 \leq i \leq M$) at the instants $t_{K+1}$ in applying for example a technique of source separation and source identification as described in the references [2] [3].

Step No. 8: For $1 \leq m \leq M$ determining the indices i(m) in applying the equation (4) and in using the vector $a_{km}$ and the vectors $b_i$ for ($1 \leq i \leq M$).

Step No. 9: For $1 \leq m \leq M$ the operation $a_{k+1\ m} = b_{i(m)}$ is performed.

Step No. 10: For $1 \leq m \leq M$ computation of the criterion $L_{K+1}(x,y,z)$ iteratively in using the equations (14) and (15) and minimization of $L_{K+1}(x,y,z)$ to obtain the position $(x_m, y_m, z_m)$ of the $m^{th}$ transmitter.

Step No. 11: If it is decided to go on, in order to achieve greater precision and reduced ambiguity, then the method returns to the step No. 7.

Exemplary Implementation of the Method

Figure 5:
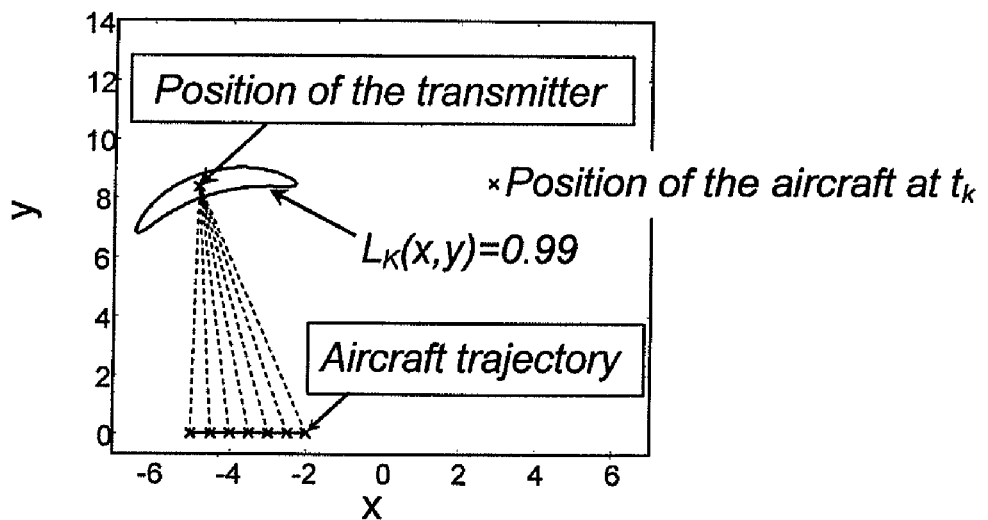
Figure 6:
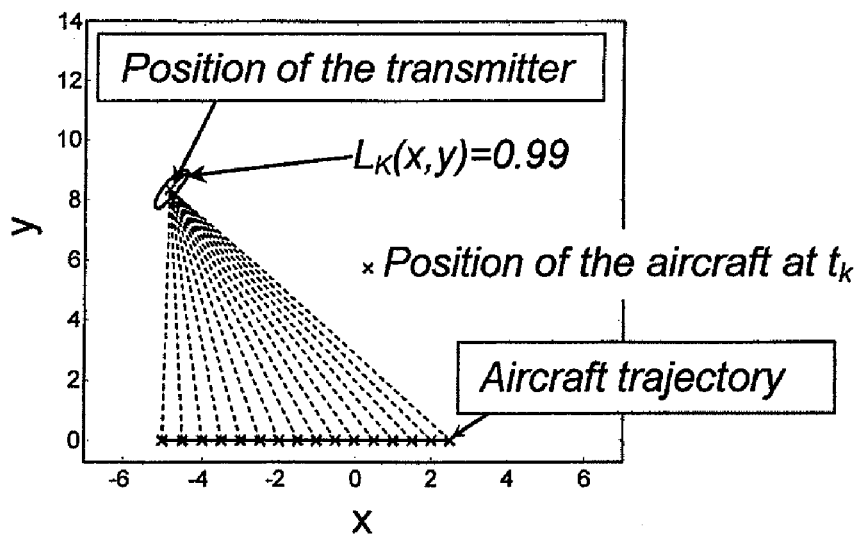

The simulations were made with a network of N=2 sensors aligned in the axis of the carrier with $d/\lambda = 3$. Since $d/\lambda = 3$ a method performing goniometry at the instants $t_k$, it would be completely ambiguous and would not subsequently enable operations of triangulation for localizing the transmitter. In FIGS. 5, 6 and 7 corresponding to the criteria of localization for K=3, 7 and 16, the pseudo-spectrum $L_K(x,y)$ to be maximized, enabling the position of the transmitter in the space (x,y) to be determined, is plotted. It being known that if the transmitter is situated in $(x_0, y_0)$, then $L_K(x_0, y_0) = 1$, it is deduced therefrom that the iso-level curves $L_K(x,y) = 0.99$ characterize the width of the major lobe. Observing that the precision of localization depends on the width of this lobe, it is deduced therefrom, according to FIGS. 5, 6 and 7 that the greater the value of K, the greater will be the localizing precision.

REFERENCES

[1] R O. SCHMIDT. A *signal subspace approach to multiple emitter location and spectral estimation*, November 1981
[2] J. F. CARDOSO, A. SOULOUMIAC, Blind beamforming for non-gaussian signals, *IEEE Proceedings-F*, Vol. 140, N°6, pp. 362-370, December 1993.
[3] P. COMON, Independent Component Analysis, a new concept ?, Signal Processing, Elsevier, April 1994, Vol. 36, n°3, pp 287-314.

The invention claimed is:

1. A method for localizing one or more sources, each source (emitters) being in motion relative to a network of sensors, the method comprising the steps of:

separating the sources in order to identify the direction vectors associated with the response of the sensors to a source at a given incidence, said incidence angles varying depending on the position of the sensors network relative to said sources;

associating direction vectors $a_{1m} \ldots a_{Km}$ obtained for the $m^{th}$ transmitter and respectively at the instants $t_1 \ldots t_K$, are associated during a period Dt in order to separate different sources for each instant $t_1 \ldots t_K$, said incidence angles varying depending on the position of the sensors network relative to said sources;

wherein the direction vectors $a_{1m} \ldots a_{Km}$ obtained for the mobile sources and respectively for the instants $t_1 \ldots t_K$ are associated during the period Dt in order to separate the different sources for each instant $t_1 \ldots t_K$ the position $(x_m, y_m, z_m)$ of the mobile emitter is directly localized from the direction vectors $a_{1m} \ldots a_{Km}$ associated to a same emitter, one emitter being obtained from the different instants $t_k$;

wherein the associating step comprises:

Step ASE-1: Initialization of the process at k=2,

Step ASE-2: For 1<m<M determining the indices i(m) in using the relationship $$d(a_{km}, b_{i(m)}) = \min_{1 \leq i \leq M} [d(a_{km}, b_i)],$$

the direction vector $a_{k,m}$ and the vectors $b_i$ identified at the instant $t_{k+1}$ for (1<i<M), setting up a function $\beta_m(t_k) = d(a_{km}, a_{om})$, wherein $d(u, v) = 1 -$ $$\frac{|u^H v|^2}{(u^H u)(v^H v)}$$

Step ASE-3: For 1<m<M performing the operation $a_{k+1\ m} = b_{i(m)}$,

Step ASE-4: Incrementing k←k+1 and if k<K returning to the step ASE-1,

Step ASE-5: Starting from the family of instants $\theta = \{t_1 < \ldots < t_K\}$ thus obtained, extracting the instants $t_i$ which do not belong to a zone defined by the curve $\beta_m(t_k)$ and a zone of tolerance;

where M is the number of transmitters.

2. The method according to claim 1, wherein the localizing step comprises:

a normalized vector correlation $L_K(x,y,z)$ maximizing in the space (x,y,z) of the position of a transmitter with $$L_K(x, y, z) = \frac{|b_K^H v_K(x, y, z)|^2}{(b_K^H b_K)(v_K(x, y, z)^H v_K(x, y, z))}$$

with $$b_K = \begin{bmatrix} b_{1m} \\ \vdots \\ b_{Km} \end{bmatrix} = v_K(x_m, y_m, z_m) + w_K,$$

$$v_K(x, y, z) = \begin{bmatrix} b(t_1, x, y, z) \\ \vdots \\ b(t_K, x, y, z) \end{bmatrix} \text{ and } w_K = \begin{bmatrix} w_{1m} \\ \vdots \\ w_{Km} \end{bmatrix}$$

where $W_K$ is the noise vector for all the positions (x, y, z) of a transmitter; and wherein the vector $b_K$ comprises a vector representing the noise, the components of which are functions of the components of the direction vectors $a_{1m} \ldots a_{Km}$.

3. The method according to claim 2, wherein comprising:

a step in which the matrix of covariance $R=E[w_K w_K^H]$ of the noise vector is determined and in that the following criterion is maximized:

$$L'_K(x, y, z) = \frac{|b_K^H R^{-1} v_K(x, y, z)|^2}{(b_K^H R^{-1} b_K)(v_K(x, y, z)^H R^{-1} v_K(x, y, z))}$$

Where $v_x$ is a speed vector and $b_k$ is vector for source separation and source identification.

4. Method according to claim 3, wherein the evaluation of the criterion $L_K(x,y,z)$ and/or of the criterion $L_K'(x,y,z)$ is recursive.

5. The method according to claim 3, wherein it comprises a step of comparison of the maximum values with a threshold value.

6. The method according to claim 1, wherein the value of K is initially fixed at $K_0$.

7. The method according to claim 1, wherein the transmitters to be localized are mobile and in that the direction vector considered is parameterized by the position of the transmitter to be localized and the speed vector.

* * * * *